US012591772B1

(12) United States Patent
Ouyang et al.

(10) Patent No.: US 12,591,772 B1
(45) Date of Patent: ***Mar. 31, 2026

(54) TECHNIQUES FOR TRAINING IDENTITY TRANSFER MODELS

(71) Applicant: Amazon Technologies, Inc., Seattle, WA (US)

(72) Inventors: Wenbin Ouyang, Redmond, WA (US); Naveen Sudhakaran Nair, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1068 days.

This patent is subject to a terminal disclaimer.

(21) Appl. No.: 17/542,013

(22) Filed: Dec. 3, 2021

(51) Int. Cl.
| | |
|---|---|
| *G06N 3/08* | (2023.01) |
| *G06N 3/045* | (2023.01) |
| *G06V 10/25* | (2022.01) |
| *G06V 40/16* | (2022.01) |
| *G10L 21/013* | (2013.01) |
| *G10L 21/10* | (2013.01) |

(52) U.S. Cl.
CPC .............. *G06N 3/08* (2013.01); *G06N 3/045* (2023.01); *G06V 10/25* (2022.01); *G06V 40/161* (2022.01); *G10L 21/013* (2013.01); *G10L 21/10* (2013.01)

(58) Field of Classification Search
CPC .......... G06N 3/08; G06N 3/045; G06V 10/25; G06V 40/161; G10L 21/013; G10L 21/10
See application file for complete search history.

(56) References Cited

U.S. PATENT DOCUMENTS

| | | |
|---|---|---|
| 11,790,884 B1 | 10/2023 | Shakeri et al. |
| 2018/0225710 A1 | 8/2018 | Kar et al. |
| 2020/0005764 A1 | 1/2020 | Chae |
| 2020/0365166 A1 | 11/2020 | Zhang et al. |
| 2020/0410976 A1 | 12/2020 | Zhou et al. |
| 2021/0034666 A1 | 2/2021 | Detroja et al. |
| 2021/0183358 A1 | 6/2021 | Mao et al. |
| 2021/0280165 A1 | 9/2021 | Yu et al. |
| 2022/0051654 A1 | 2/2022 | Finkelstein et al. |
| 2022/0157316 A1 | 5/2022 | Rebryk et al. |

(Continued)

FOREIGN PATENT DOCUMENTS

WO      2021101665      5/2021

OTHER PUBLICATIONS

Deng, Kangle, Aayush Bansal, and Deva Ramanan. "Unsupervised audiovisual synthesis via exemplar autoencoders." arXiv preprint arXiv:2001.04463. (Year: 2020).*

(Continued)

*Primary Examiner* — KC Chen
*Assistant Examiner* — Kuang F Chen
(74) *Attorney, Agent, or Firm* — Eversheds Sutherland (US) LLP

(57) ABSTRACT

Systems, devices, and methods are provided for training and/or inferencing using machine-learning models. In at least one embodiment, an identity embedding and a content embedding are extracted from training media data, such as training audio data and/or training visual data. The identity embedding may encode information relating to a person's voice and/or visual properties. A decoder may be trained to create synthetic media, such as audio and visual content, based on identity and content embeddings.

20 Claims, 8 Drawing Sheets

(56) References Cited

U.S. PATENT DOCUMENTS

| | | |
|---|---|---|
| 2022/0270611 A1 | 8/2022 | Tuo et al. |
| 2023/0018384 A1 | 1/2023 | Finkelstein et al. |
| 2023/0059882 A1 | 2/2023 | Zhang et al. |
| 2023/0162021 A1 | 5/2023 | Chorakhalikar et al. |
| 2023/0238002 A1 | 7/2023 | Hirano |

OTHER PUBLICATIONS

Ying, Yangwei, Yuanwu Tu, and Hong Zhou. "Unsupervised feature learning for speech emotion recognition based on autoencoder." Electronics 10.1: 2086. (Year: 2021).*

Polyak, Adam, et al. "Speech resynthesis from discrete disentangled self-supervised representations." arXiv preprint arXiv: 2104.00355. (Year: 2021).*

Zhang et al. (2020) Durian-sc: Duraction informed attention network based signing voice conversion system arXiv preprint arXiv:2008.03009 (Year:2020).

Sisman, B., Yamagishi, J., King, S., & Li, H. (2020). An overview of voice conversion and its challenges: From statistical modeling to deep learning. IEEE/ACM Transactions on Audio, Speech, and Language Processing, 29, 132-157.

* cited by examiner

800

| | |
|---|---|
| 802 — HARDWARE PROCESSOR | GRAPHICS DISPLAY DEVICE — 810 |
| 824 — INSTRUCTIONS | INPUT DEVICE — 812 |
| 804 — MAIN MEMORY | UI NAVIGATION DEVICE — 814 |
| 824 — INSTRUCTIONS | STORAGE DEVICE — 816 |
| 806 — STATIC MEMORY | MACHINE-READABLE MEDIUM — 822 |
| 824 — INSTRUCTIONS | INSTRUCTIONS — 824 |
| 828 — SENSORS | SIGNAL GENERATION DEVICE — 818 |
| 820 — NETWORK INTERFACE | TRANSFER MODEL SYSTEM — 836 |
| 830 — ANTENNA(S) | POWER DEVICE — 832 |
| 808 | OUTPUT CONTROLLER — 834 |

826 — COMMUNICATIONS NETWORK

TECHNIQUES FOR TRAINING IDENTITY TRANSFER MODELS

BACKGROUND

Generating audio and/or video content is typically a time-consuming task that involve the recording or filming of an individual to record a desired song, video, or other media content. While machine-learning techniques are able to generate some types of media content, there are still many limitations. For example, there are many challenges involved in remixing media content. Remixing media content may involve creating a novel rendition of media content where aspects of one source and aspects of another source are combined. For example, a song from a first artist may be remixed with the voice of a second artist to create a cover. However, there are many challenges involved in extracting intertwined aspects of a media and/or generating remixed media content from multiple sources.

Figure 1:
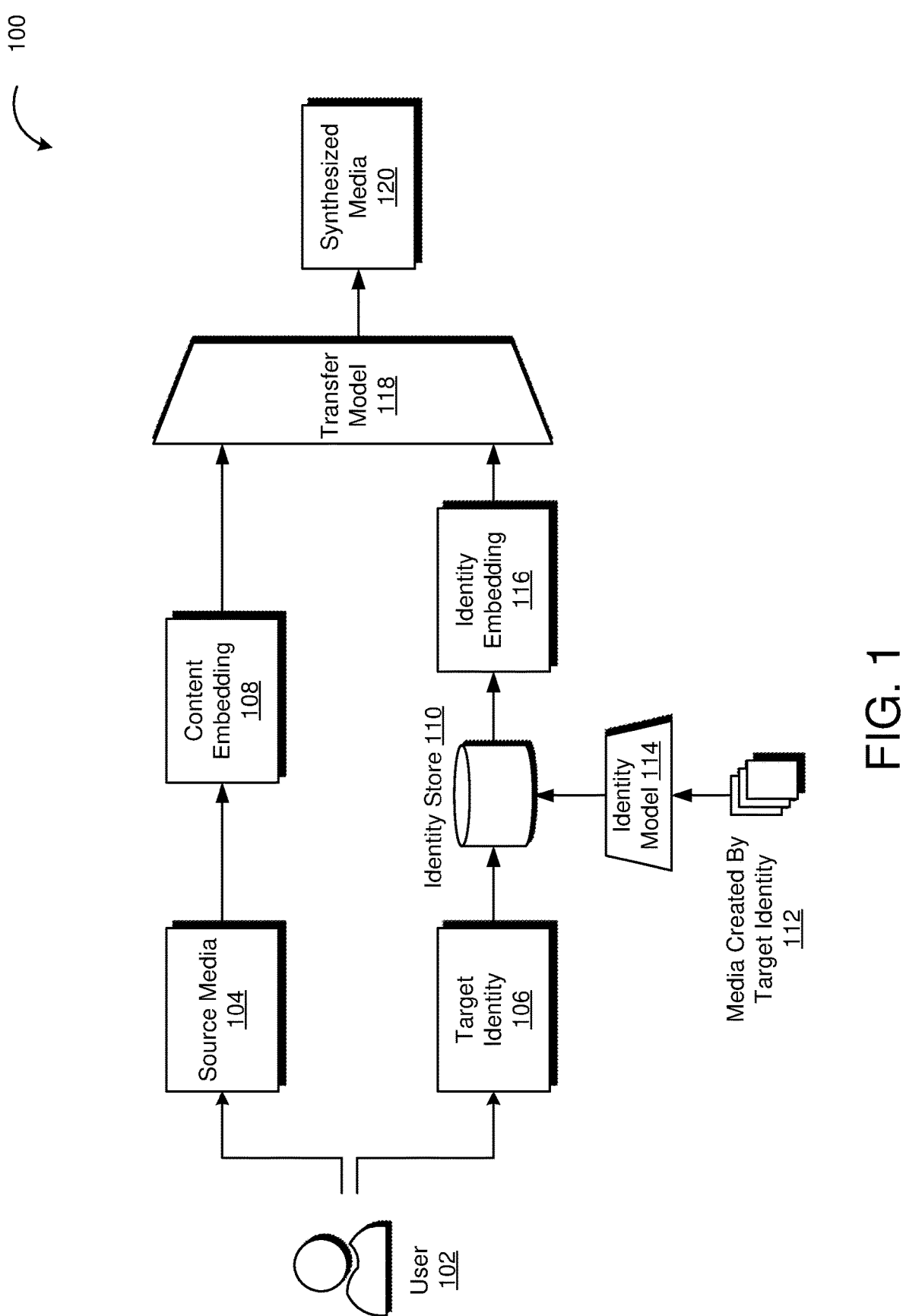
FIG. 1 illustrates a computing environment in which identity transfer techniques are utilized to create synthesized media, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for generating media content using a machine-learning (ML) identity transfer model. As a non-limiting example, a user can use a ML voice identity transfer model to generate song covers by selecting a song by a first artist, selecting an identity model (e.g., a profile for a second artist), and use the ML transfer model to generate a cover that is sung in the voice of the second artist. It should be noted that the second artist is not actually required to record or sing the cover, but rather, a ML transfer model uses properties of the second artist's voice profile to mimic the original performance.

Machine-learning (ML) identity transfer models described herein may be used in the following manner: a user first selects audio content comprising a song or a portion thereof and a target identity. The selected audio content may be processed to determine a spectrogram of the audio. A spectrogram may be a 2-D or 3-D representation of the spectrum of frequencies of audio signals in the selected audio, and can be used for various types of signal processing, such as to identify spoken words phonetically. The spectrogram may be a mel spectrogram wherein a first axis represents time, a second axis represents a mel scaled frequency, and a third axis represents the amplitude of a particular frequency at a particular time. The spectrogram may be provided as an input of an encoder that maps the spectrogram to a content embedding vector that represents the contents of the audio, such as the cadence, pitch, words, etc., which are extracted from the spectrogram using the encoder to produce a vector of values that represents the audio content. A voice identity embedding vector for the user may be obtained from a database or other suitable repository. The voice identity embedding may have been generated by analyzing previously recorded speech and audio data of the target identity as part of an extraction process. The voice identity embedding may be a vector of values that represents properties of the user's voice. A decoder may receive the voice identity embedding of a user-selected identity and a content embedding determined from a user-selected audio content as inputs and generate an audio output based on the provided embeddings. The decoder may be a model that is trained to produce audio according to the content of the content embedding and the voice of the voice identity embedding.

As described herein, identity transfer models can be used to generate song covers, remixed video clips, and other types of media or multimedia for the benefit of various parties. This is enjoyable for cover creators because they would find it satisfying to create content in their own voice or appearance, and thereby reach a larger audience. The new voice/appearance would satisfy an audience's curiosity to see or hear media content in a different voice/visual. Accordingly, users can become content creators and are limited only by their own creative skills.

In various embodiments, users of an audio playback service or software are given the option to purchase, lease, or trial audio remixes. For example, a user may typically listen to music on a smartphone, tablet, or other mobile device and access songs to play through a graphical user interface. The graphical user interface, in some embodiments, provides a drop-down menu or other user-interactable object for the user to select a cover artist for the song. A list of available cover artists may be presented, wherein identity models for each of the cover artists may be used to generate covers of the song by taking the audio content from the song and the identity model of the selected artist to generate a cover of the song in the voice of the user's chosen artist.

While song covers are described as an illustrative example, these techniques described herein are not limited to songs, but can be extended to other forms of audio and video performances, such as dancing, acting, live theater, and so forth. For instance, one may wish to experience seeing his/her favorite character or themselves in a short clip of a movie playing an important character that was originally portrayed by someone else. Further, by leveraging context-aware translation AI models, the AI-generated performance can be used to local content to a desired language.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which identity transfer techniques are utilized to create synthesized media, in accordance with one or more example embodiments of the present disclosure. The environment 100 depicted in FIG. 1 may be utilized to generate synthesized audio content, synthesized visual content, synthesized audio and visual (AV) content, and the like. For example, user 102 can use environment 100 to generated synthesized short video clips and share them on a social media network.

User 102 may refer to a customer of a service provider, which may provide various media-related services. Media may refer to audio content, visual content, or combinations thereof. User 102 may refer to a computer system that is controlled by a human user. User 102 may have an identity or account identifier associated with him/her. In some cases, user 102 logs into a website, mobile application, or other uses another graphical interface to interact with a service provider to control, specify, or otherwise participate in the generation of synthesized media.

In various embodiments, user 102 specifies source media 104 and target identity 106. Source media 104 may refer to audio or visual content. For example, source media 104 is a song or portion thereof. Source media 104 may be made available to user 102 via an online music catalog or listening service.

Target identity 106 may refer to an individual, such as a singer, celebrity, politician, or more generally, any individual. The target identity may be indicated by a name, account identifier, or other such information that may be used to uniquely identify an individual.

The selection of source media 104 and target identity 106 by user 102 may be used by user 102 to request the generation of synthesized media. In response to the user's request, synthesized media may be generated by extracting content information from source media 104 and voice or speech information from target identity 106, and the contents of source media 104 may be re-cast to create a rendition of source media 104 using the vocal properties of target identity 106.

In some cases, media includes a visual component. In an illustrative embodiment, source media 104 refers to video content depicting a first identity (e.g., first actor) in a scene and target identity includes visual information relating to a second identity (e.g., second actor). User 102 may use systems and methods described herein to synthesize the scene from the source media with the second identity replacing the first identity.

Source media 104 generates content embedding 108 in some embodiments. Content embedding 108 may refer to an embedding vector generated from an encoder (e.g., of an auto-encoder) that encodes or otherwise represents content information of source media 104. Content information, in this context, may refer to aspects of source media that are unrelated to the identity of person or persons whose speech is in source media 104. Content may, for example, refer to the words, cadence, pitch, etc. of source media 104. In contrast, identity information may relate to properties of the speaker in a piece of audio content and be unrelated to the words, cadence, pitch, etc. For example, conceptually speaking, content embedding 108 for a song and a cover of the song should be very similar, as the main difference between the two is, in most cases, is in the singer and the cover artist's voice.

Target identity 106 may refer to a target whose voice or visual information is intended to be synthesized with the content of source media 104. For example, if source media 104 is a song, then target identity 106 may refer to a singer whose voice and vocals should be used in place of the singer in the original song. Similarly, if source media 104 is a video clip, then target identity 106 may refer to an actor whose likeness should replace that of the actor originally portrayed in source media 104. Target identity 106 may be a name, identifier, or other information that can be used to resolve an underlying individual whose audio or visual information should be combined with source media 104.

Identity store 110 may refer to a database or other suitable data storage system that can be used to store identity embeddings for various individuals. For example, identity store 110 may be implemented as a database that can be used to retrieve, from an identity identifier (e.g., identifier for target identity 106) an identity embedding. Identity store 110 may be built up from a content library. For example, a multimedia provider may have a library of millions of songs. These songs may be tagged with various information, such as the artists that sing each song. This information may be used to generate identity embeddings for the various artists of the library.

For example, when considering a specific artist, a library of multimedia content may be searched to find some or all songs of the artist. The artist's songs may then be processed using an identity model 114 that extracts identity embedding from the artist's songs that encodes characteristics of the artist's vocals, speech, etc. In this way, identity store 110 may be populated with identity embeddings for several artists, singers, celebrities, politicians.

As an illustrative example, media 112 created by target identity may refer, for example, to songs recorded by an artist. These songs may be processed by identity model 114 to generate an identity embedding for the target identity that is stored in identity store 110 alongside identity embeddings for other identities (e.g., other artists). Media 112 may refer to media created by the target identity, or more generally, any media that includes the target identity's voice can be used to generate the target identity's identity embedding.

Identity model 114 may refer to a machine-learning model that generates embeddings or codes from audio content. Identity model 114 may be implemented as an encoder, for example. The output of identity model 114 may be an embedding vector that encodes identity information of the speaker, wherein the embedding of a first media of a first speaker with first speech is identical or very similar to the embedding of second media of the first speaker. Generally speaking, the identity embedding 116 for a particular speaker should remain constant or near constant regardless of the contents for the speaker. Identity model 114 may be implemented in the context of FIG. 2.

Identity embedding 116 may refer to an identity embedding as described above. Identity embedding 116, more specifically, refers to the identity embedding for target identity 106. In various embodiments, target identity 106 is used to query identity store 110 to obtain identity embedding 116.

In various embodiments, transfer model 118 refers to an encoder or other suitable machine learning model for generating synthesized media 120. Transfer model 118 may be an encoder that receives a code or embedding vector that accepts a content embedding 108 and an identity embedding 116 to create synthesized media 120. Synthesized media may refer to media that is generated in part from content embedding 108 and in part from identity embedding 116. For example, for songs or other audio content, synthesized media may be a cover of the song with the same content (e.g., lyrics, cadence, beat) but sung by a different artist (e.g., the target identity).

Figure 2:
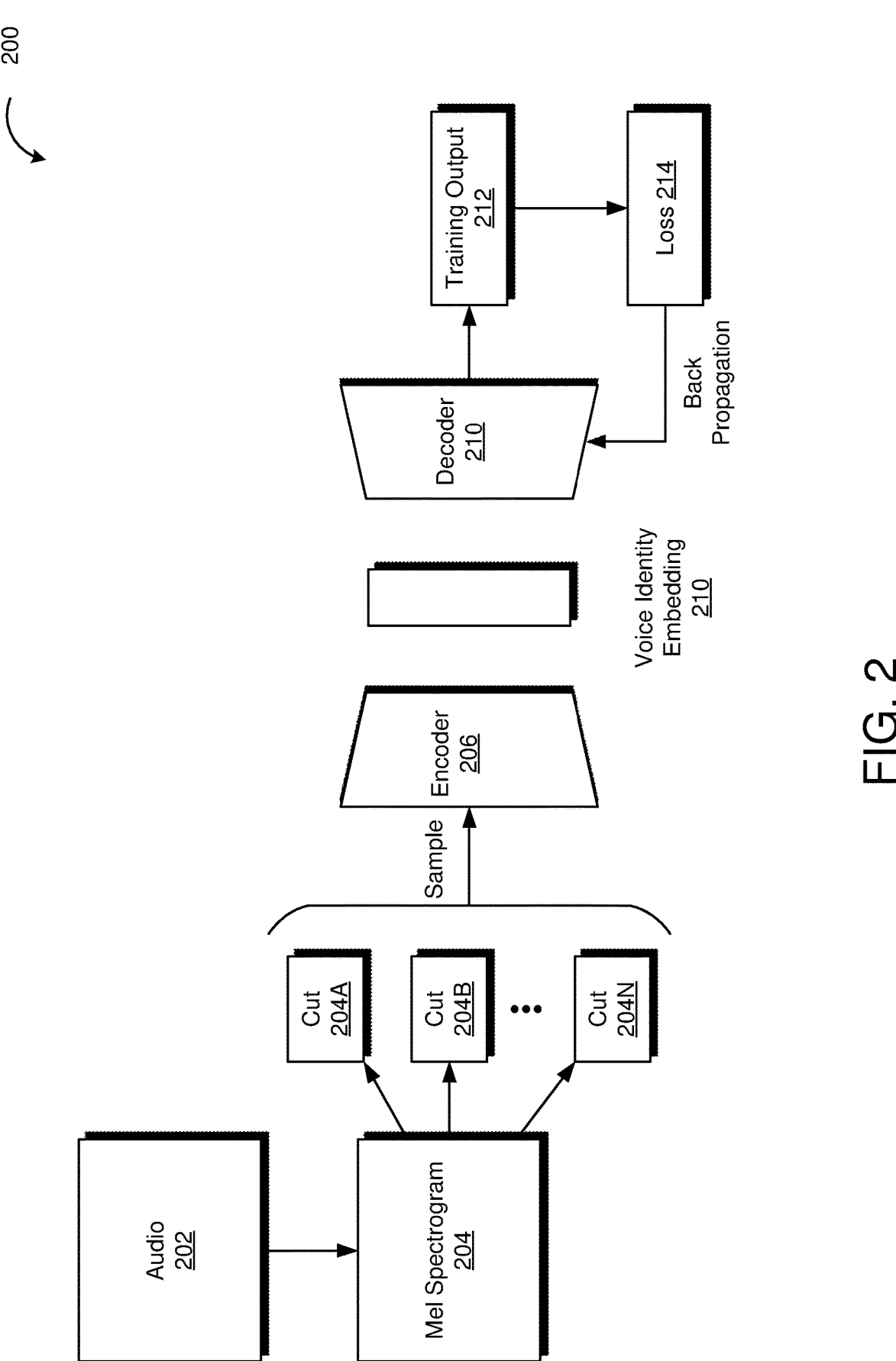
FIG. 2 illustrates a computing environment in which a voice identity network is implemented, in accordance with one or more example embodiments of the present disclosure.

FIG. 2 illustrates a computing environment 200 in which a voice identity network is implemented, in accordance with one or more example embodiments of the present disclosure. The environment 200 depicted in FIG. 2 may be utilized to generate synthesized audio content. For example, user 202 can use environment 200 to generated synthesized short audio clips and share them on a social media network. FIG. 2 is implemented in the context of a computing resource service provider, according to at least one embodiment.

Computing environment 200 may be utilized in connection with techniques described in connection with FIG. 3 to implement audio conversion techniques that utilize identity transfer and content transfer techniques. A voice identity network is trained to obtain a voice identity embedding. In order to eliminate content information and force the network to learn to extract identity characteristics, an audio clip may be transformed to a mel spectrogram, which is then divided into several portions or cuts. Each portion or cut may be provided to an autoencoder, which performs unsupervised learning to reconstruct an original mel spectrogram. A reconstruction loss may be computed between the output of the autoencoder and a randomly selected cut. This approach is made possible by the fact that each cut is assumed to encode the same identity information (e.g., single singer in an entire track). In this way, the voice identity network is able to learn the voice identity and ignore the content from the loss, as the input content and the evaluation content are different. The loss may be computed and back propagated to the autoencoder to refine the parameters of the autoencoder and to further reduce loss over the training process.

Audio 202 may refer to an audio file, audio stream, audio signal, portions thereof, or any other suitable representations of audio data. Audio 202 may be an audio recording as a .wav, .mp3, or other suitable formats. Signal processing techniques may be used to generate a mel spectrogram 204 of audio 202. A spectrogram may refer to a representation of the spectrum of frequencies of a signal as it varies with time. The spectrogram may be a mel spectrogram wherein a first axis represents time, a second axis represents a mel scaled frequency, and a third axis represents the amplitude of a particular frequency at a particular time.

Cut 204A-N may refer to cuts or portions of the mel spectrogram 204. In various embodiments, each cut is a separate and non-overlapping portion of mel spectrogram 204 of equal lengths. As part of the training process, a cut may be sampled or randomly selected from cuts 204A-N and provided as an input to encoder 206. Encoder 206 may be used to generate a code, depicted as voice identity embedding 210 in FIG. 2.

Voice identity embedding 210 may refer to an embedding vector generated by encoder 206 that encodes voice identity information for a speaker, singer, vocal artist, etc. of audio 202. In various embodiments, voice identity embedding 210 is generated as the output of encoder 206 and provided as an input to decoder 210 to produce a training output 212. The training output 212 may be a mel spectrogram. In some cases, the training output is or is used to generate output audio in a format analogous to audio 202. Training output 212 may be used to compute a reconstruction loss-however, rather than using the cut that was provided as the input to encoder 206, a random cut is selected and a comparison is made between the output and the randomly selected cut. This serves to reduce or eliminate the effect of the content of a cut during training, and instead emphasizes the identity of the speaker. Accordingly, the autoencoder network described in connection with FIG. 2 will properly learn the voice identity and ignore the content from the loss since the contents are misaligned during the loss calculation. A loss 214 may be implemented as Loss (Output, Random (cut i)) such that the loss is computed as a difference (e.g., cosine difference) between the output and a random cut. In some embodiments the random cut is selected so as to be a different cut from the cut that was sampled or randomly selected as the input to encoder 206. The loss may be computed and back propagated to the autoencoder to refine the parameters of the autoencoder and to further reduce loss over the training process.

Once the autoencoder has been trained, the trained encoder can be used to generate a catalog of voice identity embeddings that can be used to synthesize audio content at scale. For example, a music content provider can use a trained encoder to generate voice identity embeddings for all artists in the content provider's library. For an artist, some or all songs can be provided to the trained encoder to produce a voice identity embedding for the artist. These voice identity embeddings may be generated for some or all artists of the content provider library. For example, some artists that do not have enough songs to generate reliably high quality voice identity embeddings may be excluded. The voice identity embeddings may be collected and retained in an identity store, such as those described in connection with FIG. 1, and used for synthesizing media content.

Figure 3:
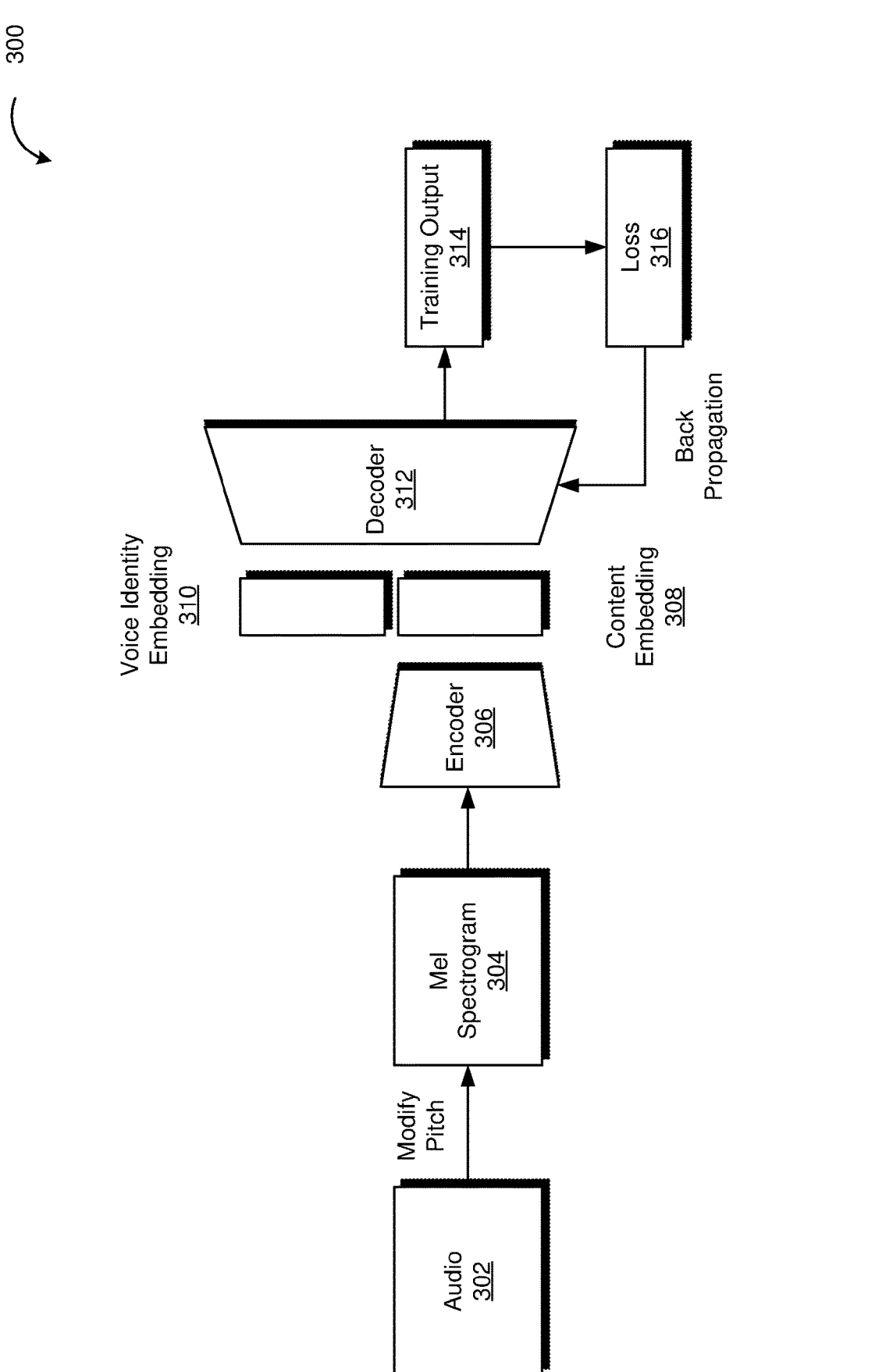
FIG. 3 illustrates a computing environment in which a content network is implemented, in accordance with one or more example embodiments of the present disclosure.

FIG. 3 illustrates a computing environment 300 in which a content network is implemented, in accordance with one or more example embodiments of the present disclosure. The environment 300 depicted in FIG. 3 may be utilized to generate synthesized audio content. For example, user 302 can use environment 300 to generated synthesized short audio clips and share them on a social media network. FIG. 3 is implemented in the context of a computing resource service provider, according to at least one embodiment.

Computing environment 300 may be utilized in connection with techniques described in connection with FIG. 2 to implement audio conversion techniques that utilize identity transfer and content transfer techniques. For example, voice identity embeddings depicted in FIG. 2 may be generated using voice identity networks described in connection with FIG. 2. By conditioning the voice identity embedding and applying transforms to the pitch of the audio, the content network can learn only the content information. The content network is trained using a loss that minimizes reconstruction loss (same content) and to maximize the difference between the voice identity embedding and content embedding, according to at least one embodiment.

Audio 302 may refer to an audio file, audio stream, audio signal, portions thereof, or any other suitable representations of audio data. Audio 302 may be an audio recording as a .wav, .mp3, or other suitable formats. Signal processing techniques may be used to generate a mel spectrogram 304 of audio 302. A spectrogram may refer to a representation of the spectrum of frequencies of a signal as it varies with time. The spectrogram may be a mel spectrogram wherein a first axis represents time, a second axis represents a mel scaled frequency, and a third axis represents the amplitude of a particular frequency at a particular time. Audio 302 may be the same audio as described in connection with FIG. 2.

In various embodiments, training a content network comprises obtaining audio 302 and modifying the pitch of the audio. Audio 302, more generally, speaking, can be modified to have the singer's pitch raised or lowered, or other transforms performed to alter the voice-related related properties of the performance while preserving content-related properties. The audio pitch is randomly changed, according to some embodiment. A signal processing routine may be applied to the transformed or modified version of audio 302 to obtain a spectrogram, such as a mel spectrogram 304. Mel spectrogram 304 may be provided as an input to encoder 306.

Encoder 306 may refer to an input layer of an autoencoder that maps inputs to a code or embedding. In various embodiments, encoder 306 receives, as an input, a mel spectrogram and reduces the dimensionality of the input to an embedding vector of fixed size. The encoder may be trained to extract content embeddings from the input spectrogram. For example, the content embeddings can be used to distinguish between the phonemes of one song from another while ignoring or minimizing the change to embedding values arising from voice or identity-related properties, such as vocal properties (e.g., pitch, fry, inflections, resonance) of who is singing the song.

Content embedding 308 may refer to an embedding vector generated from an encoder (e.g., of an auto-encoder) that encodes or otherwise represents content information of mel spectrogram 304. Content information, in this context, may refer to aspects of source media that are unrelated to the identity of person or persons whose speech is in mel spectrogram 304. Content may, for example, refer to the words, cadence, pitch, etc. of mel spectrogram 304. In contrast, identity information may relate to properties of the speaker in a piece of audio content and be unrelated to the words, cadence, pitch, etc. For example, conceptually speaking, content embedding 308 for a song and a cover of the song should be very similar, as the main difference between the two is, in most cases, is in the singer and the cover artist's voice.

Voice identity embedding 310 may refer to an embedding vector generated using techniques described in connection with FIG. 2. For example, a voice identity encoder may be used to map voice-related properties of a speaker, singer, vocal artist, etc. to a fixed-sized embedding vector. In various embodiments, a voice identity network as described in connection with FIG. 2 is trained concurrently with a content network as described in connection with FIG. 3.

Decoder 312 may refer to a decoder of an autoencoder that receives, as inputs, content embedding 308 and voice identity embedding 310 and generate a training output 314. The training output may be a spectrogram (e.g., mel spectrogram) with content-related properties derived from content embedding 308 and voice-related properties derived from voice identity embedding 310. For example, content embedding 308 may encode a song such as "Happy Birthday" and voice identity embedding 310 may represent the vocal properties of an individual's favorite actor or actress. Decoder 312 may, accordingly, be used to generate a synthetic rendition of "Happy Birthday" that sounds as if it were sung by the favorite actor or actress. It should be noted that in this context, "synthesized" media refers to media that is programmatically generated rather than being recorded. For example, a movie scene filmed with Actor X performing a stunt is not considered a synthetic media in the context of this disclosure even though digital recording components may be used in the filming process. Conversely, processing a movie scene filmed with Actor X performing a stunt and using machine-learning techniques described herein to replace Actor X with machine-generated version of Actor Y with facial features and mouth-points that are programmatically generated would be considered synthetic media, as Actor Y was not actually filmed.

Loss 316 may be computed based on the training output 314 generated by decoder 312. In various embodiments, loss 316 is determined based on two loss components—first, a reconstruction loss, and second, a difference loss. Reconstruction loss may be determined by comparing the training output 314 against the original audio 302. The difference between the training output 314—which may be generated from a first mel spectrogram of the transformed audio, and a second mel spectrogram of the original audio, may be used to minimize the effect of the identity-related transformations to audio 302. In some embodiments, a different transform is applied to the original audio, to produce a second transformed audio that is used to compute the difference loss. It should be appreciated that when transformations to pitch or other voice-related properties are performed, the content should remain the same, therefore, the content embedding for original audio, first transformed audio with the pitch modified upward, second transformed audio with the pitch modified downward, etc. should be expected to have the same content embedding. Difference loss may be used to maximize the difference or minimize the similarity between the voice identity embedding and content embedding to ensure that these two embeddings are more likely to encode mutually exclusive properties of the input audio. Conceptually, this may be done to improve the identification and separation of identity-related aspects of audio from the content-related aspects of the audio. Loss 316 may be computed as follows:

$$\text{Loss}_{Total} = \text{Loss}_{recon} - \lambda \cdot \text{Loss}_{difference}$$

$\text{Loss}_{recon}$ (training output, original mel spectrogram)
$\text{Loss}_{difference}$ (identity embedding, content embedding)

The loss 316 may be computed and back propagated to the autoencoder network to refine the parameters of the autoencoder. The training process depicted in FIG. 3 can be repeated using several different audio inputs, providing the autoencoder network with a greater variety of content (e.g., songs from a media library), identities (e.g., songs from several different artists), and so forth.

In some embodiments, the reconstruction loss portion of loss 316 is determined based on the difference between the training output and ground truth data. In various embodiments, the mel spectrogram of the original training input audio before applying any transformation as the ground truth. In some embodiments, the ground truth used to compute the reconstruction loss is obtained from a different audio source, such as a cover of the same song that is sung by a different artist or identity. The content of the cover and the original input audio may be considered to be the same, or to share a large amount of overlapping content, meaning that the main differences between the two would be related to the vocal properties of the different singers.

While several audio-based examples are described in the context of music (e.g., songs), other types of audio-based media such as audiobooks podcasts, speeches, commentary, debates, announcements, etc. can also be synthesized. In some embodiments, a user is able to select an audiobook as the source media of choice and select an identity profile of an individual whose voice is pleasing to the user and have the audiobook played in that speaker's voice, thereby producing a more pleasing and tailored listening experience for the user.

Figure 4:
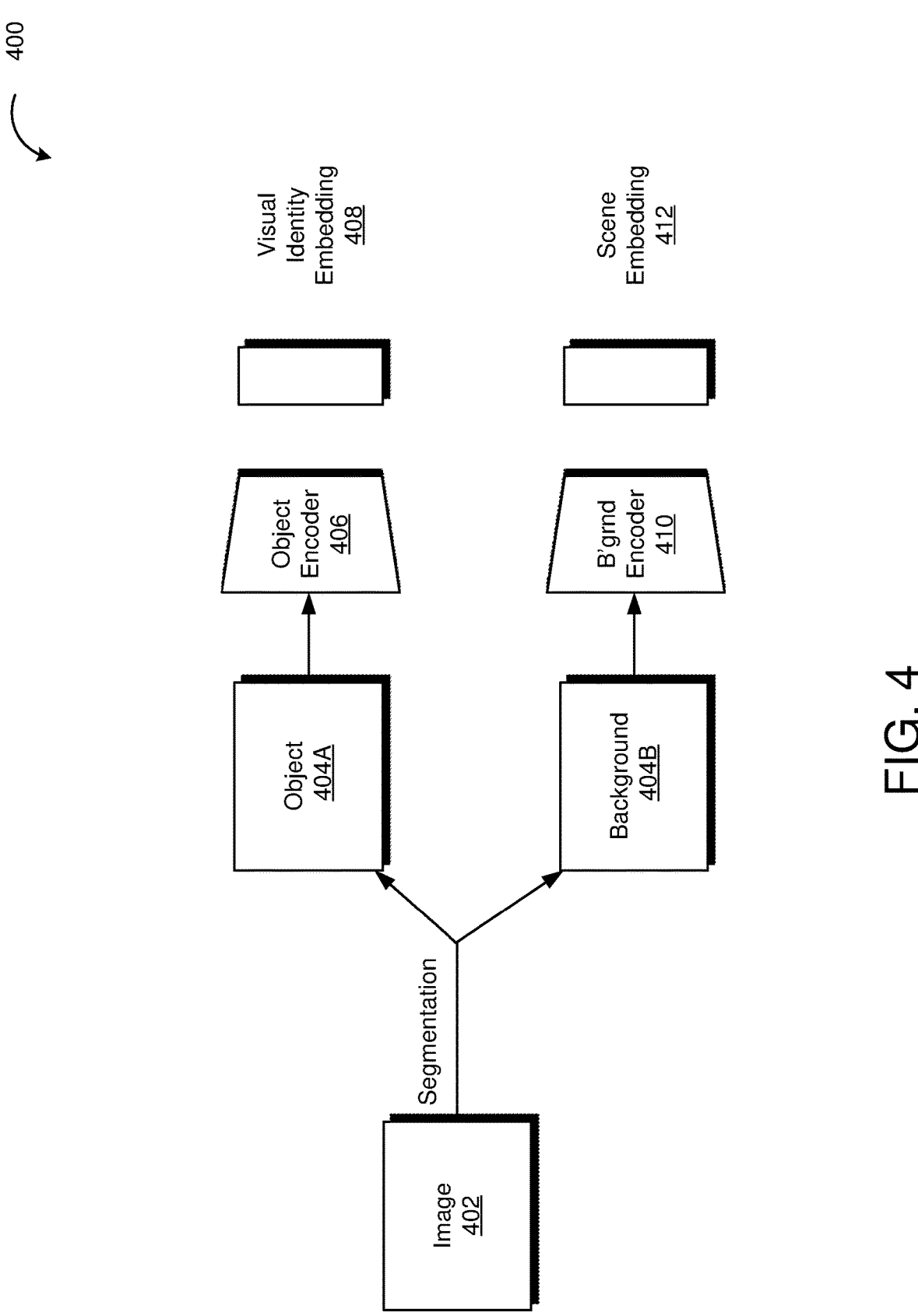
FIG. 4 illustrates a computing environment in which an image embedding network is implemented, in accordance with one or more example embodiments of the present disclosure.

FIG. 4 illustrates a computing environment 400 in which an image embedding network is implemented, in accordance with one or more example embodiments of the present disclosure. The environment 400 depicted in FIG. 4 may be utilized to generate synthesized video/image content. For example, a user can use environment 400 to generated synthesized short video clips and share them on a social media network. FIG. 4 is implemented in the context of a computing resource service provider, according to at least one embodiment. An image synthesis pipeline may be implemented using an image embedding network, audio to mouth keypoints network, and image synthesis network, as described in connection with some or all of FIGS. 4-6.

Image 402 may refer to a frame of a video or a standalone image (e.g., captured by a digital camera). In various embodiments, image 402 captures or records a real-world scene with various features of interest, which may depict a person (e.g., an actor) whose face is visible, as well as the background or scene in which the person is being depicted.

Image segmentation may be performed on image 402 to obtain two or more non-overlapping portions. While segmentation is depicted in FIG. 4, it should be noted that various visual machine-learning algorithms, such as face detection algorithms, object detection algorithms, and so forth, may be used to segment image 402 into an object 404A portion and a background 404B portion. In some embodiments, image 402 is segmented into greater than two non-overlapping. For example, an image that depicts a scene with two actors may be segmented into a first portion that comprises a first set of pixels corresponding to the region of the image that corresponds to a first object (e.g., face or other object of interest), a second set of pixels corresponding to the region of the image that corresponds to a second object (e.g., face or other object of interest), and the remaining pixels corresponding to a background portion.

In various embodiments, when multiple objects are detected in an image, an object detection algorithm is performed to identify the individual identities of the objects in the scene. When identities have been determined, this information may be used to identify appropriate embeddings. For example, consider an example in which an image depicts a scene with Actor X and Actor Y. A user may specify that s/he wishes to generate a synthetic video in which Actor X's face and likeness is replaced by Actor Z's. In such a case, an embodiment would involve a face detection algorithm being used to identify a first face region and a second face region, and then a face identification algorithm would determine which of the two face regions is that of Actor X. The identified face region may then be used to determine the identity embedding, and the other portions of the image (e.g., including the face region for Actor Y) is used to determine the scene embedding.

Object 404A region may refer to the portion of image 402 that corresponds to where a particular object of interest is located, such as where the face of a particular identity is located. The object 404A region, in some embodiments, is manually selected by the user drawing or otherwise manually indicating a portion of image 402 that the user wishes to replace. In various embodiments, the user is provided with a selection of choices from among multiple faces that are detected within image 402. Object 404A may refer to a face, or other region of interest. In some embodiments, object encoder 406 is used to extract visual identity information relating to an entire person—for example, if a video depicts a first actor performing an action scene to run across the screen, then the object 404A extracted from image 402 may be the entire body of the actor, which may be used to determine visual identity embedding. Accordingly, there may even be different types of visual identity embeddings associated with an identity. An actor may have a first visual identity embedding that corresponds to their facial features and a second visual identity embedding generated from their body constitution or makeup.

Object 404A may be provided to an object encoder 406 that generates visual identity embedding 408. In at least one embodiment, object encoder 406 is an encoder of an autoencoder network trained to extract facial features of an identity (e.g., where the object of interest is a person's face), which may include various face-related properties that are unique to individuals. These may include skin color, skin complexion, eye size, facial shape, jaw line, eye shape, iris size, eye color, eyebrows, nose shape, mouth shape, lip shape, and various other facial features that may distinguish one identity from another.

Background 404B may be provided to a background encoder 410 that generates scene embedding 412. In at least one embodiment, background encoder 410 is an encoder of an autoencoder network trained to extract scene information from an image or portion thereof. The scene embedding 412 may represent features or properties of the background of scene or that otherwise define how the surrounding portions of an image around a face or multiple faces appear.

An image embedding network, such as those described in connection with FIG. 4, may be implemented in the context of an image synthesis pipeline and, in various embodiments, are utilized in conjunction with audio-to-mouth keypoints network and image synthesis networks described in connection with FIGS. 5 and 6.

Figure 5:
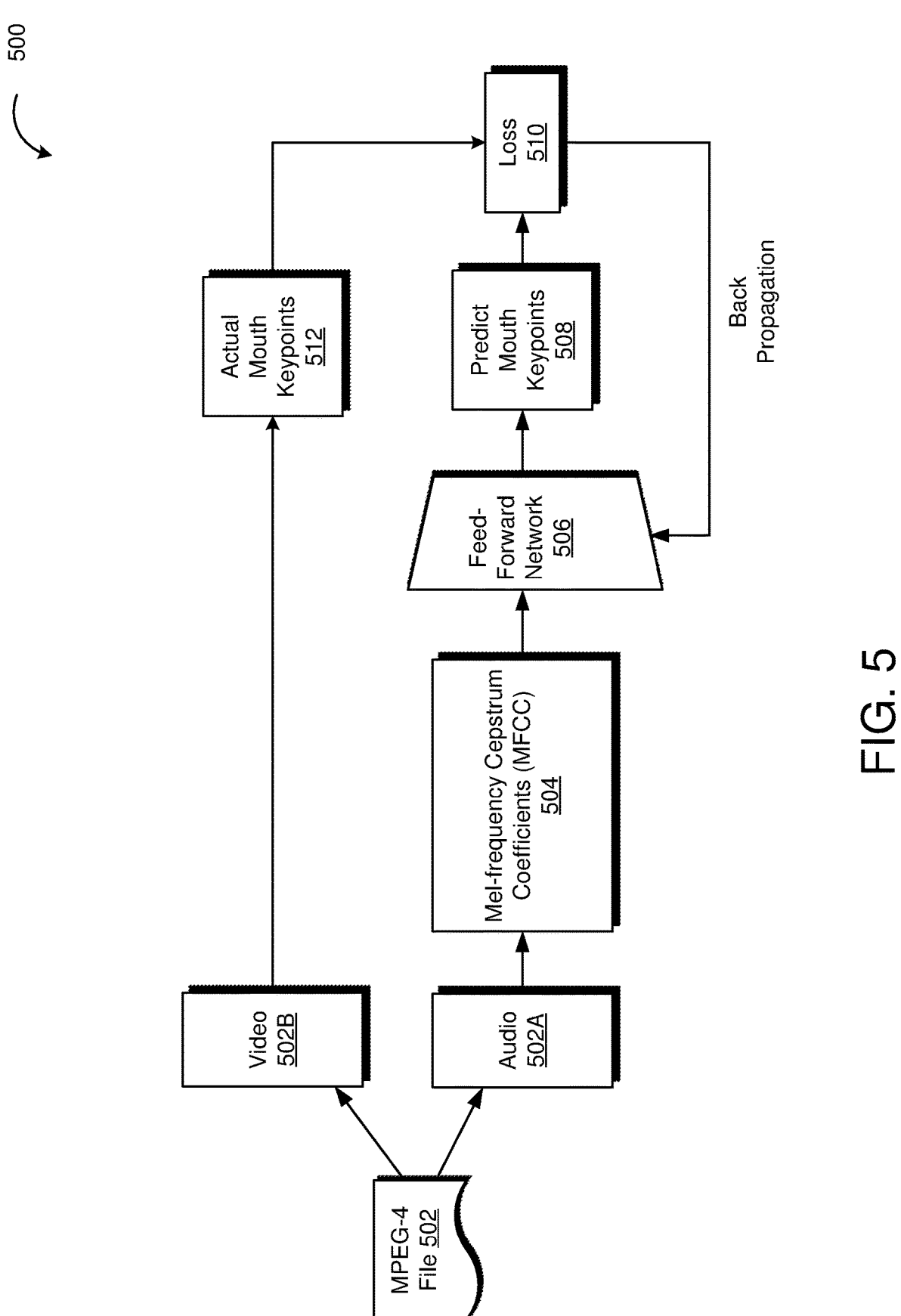
FIG. 5 illustrates a computing environment in which an audio-to-mouth keypoints network is implemented, in accordance with one or more example embodiments of the present disclosure.

FIG. 5 illustrates a computing environment 500 in which an audio-to-mouth keypoints network is implemented, in accordance with one or more example embodiments of the present disclosure. The environment 500 depicted in FIG. 5 may be utilized to generate synthesized video/image content. For example, a user can use environment 500 to generated synthesized short video clips and share them on a social media network. FIG. 5 is implemented in the context of a computing resource service provider, according to at least one embodiment. An image synthesis pipeline may be implemented using an image embedding network, audio-to-mouth keypoints network, and image synthesis network, as described in connection with some or all of FIGS. 4-6.

MPEG-4 file 502 may refer to a digital audio and visual (AV) data that comprises an audio 502A and video 502B portion. While a MPEG-4 file is depicted in FIG. 5, the techniques described herein may be applicable to other forms of AV data, including other AV files, AV streams, and other forms of multimedia that include both audio and visual portions.

An audio-to-mouth keypoints network is implemented in various embodiments where audio and visual components are involved. For example, in a video where an identity speaks, an audio conversion pipeline as described in connection with FIGS. 2 and 3 can be implemented to replace speech of a first identity with speech of a second identity. However, if corresponding video to the speech depicts the identity speaking, there may be additional challenges involved in determining how to synthesize proper lip motion. Audio-to-mouth keypoints network is, in various embodiments, used to predict the proper lip motion of a video clip from corresponding audio. Audio clips are converted into MFCC to provide phoneme information and a feed-forward network is used to predict mouth keypoints from the MFCCs.

The purpose of audio to mouth keypoints network is to directly predict the proper lip motion from the audio. A multimedia content comprising visual and audio components is parsed to extract an audio clip that is converted to MFCC (provide phoneme information), and then a feed-forward neural network takes the MFCC to predict the mouth keypoints. During the training, a loss is calculated between the predicted mouth keypoints and the original mouth keypoints, which can be extracted from the video portion of the multimedia. The computed loss may be used to update parameters of the feed-forward network to improve its predictiveness.

Audio 502A may refer to an audio portion of multimedia, for example, a movie, television show, portions thereof, and so forth. Audio 502A may refer to an audio file, audio stream, audio signal, portions thereof, or any other suitable representations of audio data. Audio 502A may be an audio recording as a .wav, .mp3, or other suitable formats. Signal processing techniques may be used to generate a mel-frequency spectrum (MFC) of audio 202. In the context of sound processing, m-frequency spectrum (MFC) is a representation of the short-term power spectrum of a sound, based on a linear cosine transform of a log power spectrum on a nonlinear mel scale of frequency. Mel-frequency cepstral coefficients (MFCCs) 504 may refer to the coefficients that collectively make up an MFC, and may be derived from a type of cepstral representation of the audio clip. While the use of a mel scale is depicted in FIG. 5, linear or other non-linear scales may be used. Mel scale is depicted in FIG. 5 as an illustrative example of how frequency warping can be used, and an appropriate scale may be selected to better represent sound, for example, in audio compression.

As depicted in FIG. 5, a feed-forward network 506 may receive MFCCs 504 generated from audio 502A. In various embodiments, one or more neural networks receive frequency cepstrum information and generates predicted mouth keypoints, lip motion, or other predictions of audio-to-mouth keypoints. These mouth-keypoints can be generated in the context of synthesizing lip-syncing animations for a target identity, for example, as part of an image synthesis pipeline.

Predicted mouth keypoints 508 may be produced as an output of feed-forward network 506. A loss 510 may be computed using the predicted mouth keypoints 508 and actual keypoints from a video. Video 502B refers to corresponding visual portion of audio 502A. While audio 502A and video 502B are discretely depicted, they may, in some cases, refer to the same file. For example, a MPEG-4 file may comprise both audio and visual portions of multimedia. Audio 502A may refer to the audio portion of a MPEG-4 file while video 502B refers to the visual portion of the same file.

The same portion of audio and visual content may be used for audio 502A and video 502B such that the audio 502A includes the audio of some speech and the video 502B includes the visual portion of the speech, including lip motions, and the like. Video 502B may be used to extract actual mouth keypoints 512 using any suitable image or video processing techniques. Loss 510 may, accordingly, be computed based on a comparison between the actual mouth keypoints 512 serving as ground truth information and predicted mouth keypoints 508 generated by feed-forward network 506. Loss 510 may be used to update parameters of the feed-forward network 506 as part of a training process that minimizes the loss, thereby teaching feed-forward network 506 to generate predicted mouth keypoints that are more similar to actual mouth keypoints.

Figure 6:
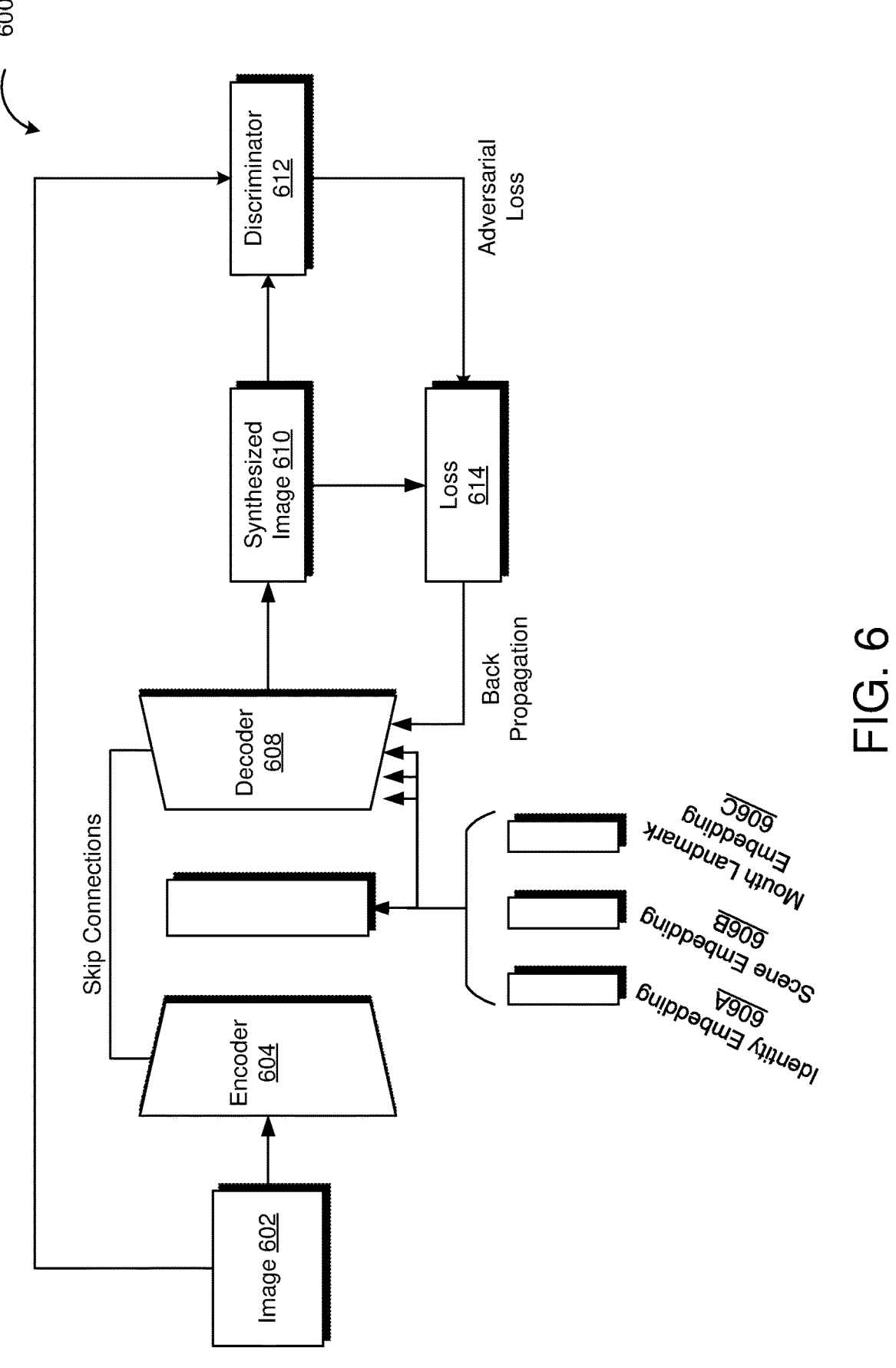
FIG. 6 illustrates a computing environment in which an image synthesis network is implemented, in accordance with one or more example embodiments of the present disclosure.

FIG. 6 illustrates a computing environment 600 in which an image synthesis network is implemented, in accordance with one or more example embodiments of the present disclosure. The environment 600 depicted in FIG. 6 may be utilized to generate synthesized video/image content. For example, a user can use environment 600 to generated synthesized short video clips and share them on a social media network. FIG. 6 is implemented in the context of a computing resource service provider, according to at least one embodiment. An image synthesis pipeline may be implemented using an image embedding network, audio to mouth keypoints network, and image synthesis network, as described in connection with some or all of FIGS. 4-6.

In various embodiments, the image synthesis network follows a U-net+discriminator structure. A visual identity embedding, scene embedding, and mouth keypoints are provided in the bottleneck and decode path of the U-net. Multiple losses, including identity loss, scene loss, mouth keypoints loss, adversarial loss, and reconstruction loss, may be computed and ensure the network to synthesizes a photorealistic image that shows the designed face with proper mouth shape in the specified scene.

Image 602 may refer to an image, frame, or other visual information. Image 602 may be in a sequence of images that form a video or motion picture. Image 602, in various embodiments, depicts the face of an individual or identity, and may include, over a sequence of media, the individual or identity speaking. The audio of such speech may, likewise, be available.

Image 602 may be provided as an input to a U-net or other suitable neural network architecture. The U-net may comprise an encoder and decoder that each have multiple layers. Mirrored layers of the encoder and decoder may be connected with skip connections. For example, the outermost layer of the encoder (e.g., first layer of encoder) may have a skip connection to the outermost layer of the decoder (e.g., last layer of decoder).

Encoder 604 may be an encoder according to a U-net architecture. In various embodiments, encoder 604 is used to extract various information from image 602. In an illustrative example, encoder 604 is trained to extract a set of embeddings from image 602 that represent different aspects of the image. Identity embedding 606A, scene embedding 606B, and mouth landmark embedding 606C may be extracted, for example. Techniques described in connection with FIGS. 4 and 5 discussing image embedding networks and audio-to-mouth keypoint networks may, in various embodiments, be utilized in the context of FIG. 6.

The set of embeddings determined by encoder 604 may be provided to a corresponding decoder 608 that using the embeddings 606A-C in an attempt to reconstruct the original image 602. In various embodiments, identity embedding, scene embedding, and mouth landmark keypoints are used to create a synthesized image 610. In this training framework, the U-net architecture is being trained to re-create image 602 based on the embeddings provided to decoder 608.

In various embodiments, synthesized image 610 and image 602 are provided to a discriminator 612. Discriminator 612 may be a neural network that is trained to distinguish between content created by a generator (e.g., the U-net architecture) and original data. Adversarial loss may be computed based on the evaluation produced by the discriminator. For example, a discriminator 612 may produce a binary result indicating which of the two images that the discriminator 612 predicts is synthesized and which is original. In some embodiments, the discriminator 612 provides a confidence level (e.g., between 0 and 1) indicating a probabilistic likelihood of which input image to the discriminator is real and which is synthesized. Adversarial loss may be computed based on the correctness of the discriminator's predictions. In this sense, the overall architecture depicted in FIG. 6 may be considered a generative adversarial network (GAN). An ideal synthesize would be able to generate synthetic images which the discriminator is unable to distinguish from original, authentic images (e.g., discriminator's ability to predict whether a first or second image is synthetic is 50%).

Overall loss 614 of a training iteration may be computed. Loss 614 may comprise a set of losses relating to different aspects of the model being trained. For example, one type of loss that is computed may be the adversarial loss, determined by comparing the discriminator's ability to distinguish between synthetic and original images.

In some embodiments, loss 614 comprises an identity loss. The identity loss may refer to how well the network depicted in FIG. 6 is able to determine identity-related information of an individual's face in an image, irrespective of content or scene information in the image. In some embodiments, an identity loss is computed by comparing the identity embedding 606A with the identity embedding extracted from a different image that includes the same individual, for example, by randomly selecting a second image of a video clip with the same individual or identity and generating an identity embedding from the second image, which would serve as the ground truth identity embedding.

In some embodiments, loss 614 comprises a reconstruction loss. Reconstruction loss may refer to an evaluation of how closely synthetic image 610 matches image 602. In some embodiments, the reconstruction loss is computed as a cosine difference or cosine similarity between the original image 602 and synthesized image 610. In some embodiments, loss 614 comprises a scene embedding loss by comparing the original scene (e.g., original background) with the synthesized scene (e.g., synthesized background). In some embodiments, loss 614 comprises mouth landmark keypoints loss that is computed by comparing the detected keypoints from the original video frame with the keypoints in the synthesized video.

Once loss 614 is computed, the loss may be back propagated to the U-net architecture to refine the parameters of the U-net architecture and to further reduce loss over the training process.

Figure 7:
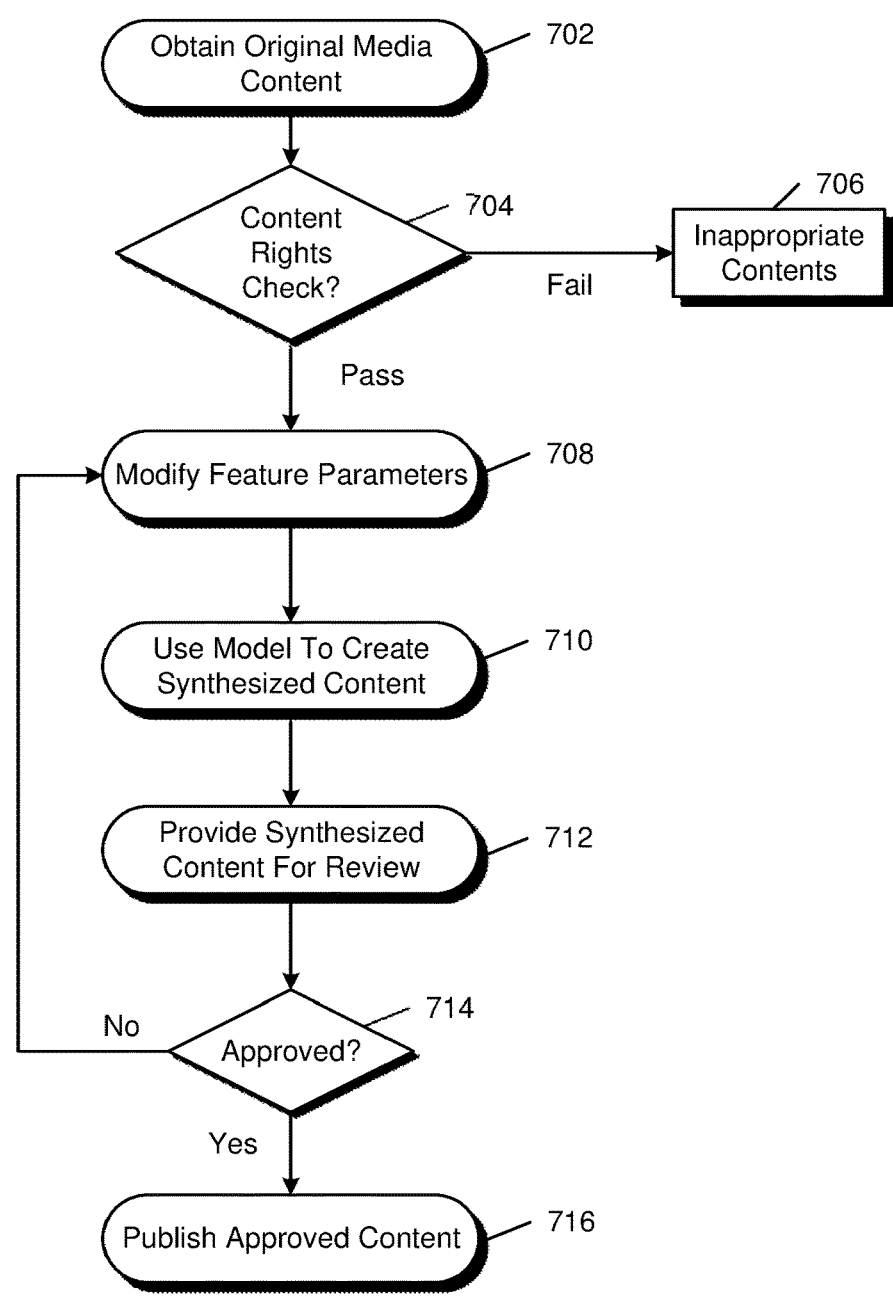
FIG. 7 shows an illustrative example of a process for creating synthetic media, such as audio remixes, in accordance with one or more example embodiments of the present disclosure.

FIG. 7 shows an illustrative example of a process 700 for creating synthetic media, such as audio remixes, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-6 and 8. In at least one embodiment, process 700 or a portion thereof is implemented by a computing resource service provider.

In at least one embodiment, process 700 comprises a step to obtain 702.

In at least one embodiment, process 700 comprises a step to perform 704 a content rights check. If the content rights check fails, then the system may provide 706 an indication of inappropriate contents. In some embodiments, the user is prompted with an option to acquire the content rights for the selected media, for example, by purchasing the media through an online purchasing system.

In at least one embodiment, process 700 comprises a step to modify 708 feature parameters. The user performing this process may be provided with a drop-down menu or other graphical interface that provides the user with options for different features to modify. For example, a user may be provided with a list of singers or artists that can be used to create remixes. The list may be retrieved from an identity store that includes records of various identities for which voice and/or visual identity embeddings were generated, for example, using techniques described in connection with FIGS. 2-6. In some embodiments, the step to modify feature parameters comprises presenting the user with a graphical interface where the user can select a transfer identity from a list of available identities. For example, for audio content, the list may include some or all identities for which voice identity embeddings are available. For example, for visual content, the list may include some or all identities for which visual identity embedding information is available. For example, for audio and visual (AV), the list may include some or all identities for which voice identity embeddings and visual identity embeddings are both available.

In some embodiments, a user is provided with an option to use their own identity as the target identity. For example, this can be used by a user to create a remix of their favorite song that is covered using their own voice. In such embodiments, the user may be prompted to provide a corpus of training media that can be used to determine a voice identity embedding and/or visual identity embedding for the user. In some embodiments, a service provider prompts the user to grant access to use audio and/or visual data of the user that the user has stored on a local disk drive, for example, previous video recordings that the user may have of himself or herself.

In at least one embodiment, process 700 comprises a step to use 710 a model to create synthesized content. The synthesized content may be media that is generated using a network as described above. For example, a content embedding of the original media and an identity embedding selected by the user may be provided as inputs to a transfer model (e.g., decoder) that generates synthesized media. In the context of audio information, the content embedding may refer to aspects of the content such as the phoneme spoken by the original identity, voice identity information identifies characteristics of a different identity, such as how they speak, whether their voice is deeper/higher, and so forth. Synthesized audio may be generated from a decoder that maps content embedding from first content with voice identity embeddings from an identity store.

For visual content, a decoder may receive a set of embeddings that identifying visual identity embeddings and scene embeddings that can be used to replace a first identity in an original image with a second identity in a generated, synthetic image. In some embodiments, mouth landmark embeddings and speech embeddings are also provided to generate the synthetic image, for example, in video clips where a user is seen speaking.

In at least one embodiment, process 700 comprises a step to provide 712 synthesize content for review. The synthesized content may be an audio recording in a .wav, .mp3, or other suitable formats. In some embodiments, the user is presented with a short clip of the synthesized content—for example, 5, 10, 15, 20, 30, 40, 50, 60 seconds in length, and may be prompted to decide whether to perform an online purchase of the content based on the preview clip. In some embodiments, singers, actors, etc. can grant permission for their identity embeddings to be used to create synthesized content in exchange for royalty payments or other compensation.

In at least one embodiment, process 700 comprises a step to determine whether 714 the content is approved. A user may listen to or watch some or all of the synthesized content to determine whether or not it is appropriate. If the user does not like the content, then the user may return to step 708 and, for example, select another singer or actor whose likeness should be used to create synthesized content. In some embodiments, a user may be prompted to provide information regarding why they did not approve of the synthesized content. The user may be provided with an option to indicate that the content was not realistic enough. This feedback from the user may be utilized as a discriminator to compute an adversarial loss, as the user provided an indication that the synthesized content was distinguishable from real content created by the identity.

In at least one embodiment, process 700 comprises a step to publish 716 approved contents. The approved content is published, in various embodiments, by persisting a copy to a network-accessible location, publishing the synthesized media to a social media network, downloading the synthesized content to the user's device, and so forth.

An autoencoder, as described throughout this disclosure, may refer to a type of artificial neural network used to learn efficient codings of data that is unlabeled. The encoding is validated and refined by attempting to regenerate the input from the encoding. The autoencoder learns a representation (encoding) for a set of data, typically for dimensionality reduction, by training the network to ignore insignificant data ("noise"). For various encoders and decoders described throughout this disclosure, the "noise" may differ—for example, for content embedding encoders, the identity of who is singing the song may be considered noise, and the content encoders may be trained to ignore identity-related properties of the singer. In a similar fashion, for voice identity encoders, the content of a song is considered noise that the voice identity encoder is trained to ignore. These techniques are depicted in FIGS. 2-3 and described in greater detail above and below.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 8:
FIG. 8 illustrates a block diagram of an example machine upon which any of one or more techniques (e.g., methods) may be performed, in accordance with one or more example embodiments of the present disclosure.
Figure 8:

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Transfer model system 836 may refer to hardware and/or software that implements techniques described in connection with FIGS. 1-7. It should be noted that systems for training and inferencing (e.g., prediction) as described herein may be performed by separate systems. For example, a training system that is used to tune the parameters of a transfer model through training processes depicted in connection with FIGS. 2-7 may be implemented on a backend service of a computing resource service provider and may be used to create various models and networks, such as encoders and decoders, independently of user requests to create content. In various embodiments, systems that create identity embeddings, such as voice and visual identity embeddings, operate asynchronously from systems that train identity transfer models and from systems that generate synthetic media in response to customer requests. Identity embeddings may be generated periodically (e.g., on a timed schedule), or when new content for an identity becomes available (e.g., when an artist releases a new album or when a music provider obtains the rights to use existing media content for generating synthetic media). Finally, the generation of synthetic media on behalf of a customer may be performed by systems described herein independently of various training processes described herein.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass.

Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device." "user device," "communication station," "station," "handheld device," "mobile device." "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could." "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:

training a first autoencoder, comprising a first encoder and a first decoder, the first autoencoder trained to at least:

obtaining first training audio data from a plurality of audio training data;

obtaining a first training spectrogram of the first training audio data;

splitting the first training spectrogram into a plurality of training segments;

selecting a first training segment of the plurality of training segments;

providing the first training segment as a training input to the first encoder to determine a first training voice identity embedding;

providing the first training voice identity embedding to the first decoder to determine a first training output;

computing a first loss based on a first difference between the first training output and a second training segment of the plurality of training segments; and updating a first set of parameters of the first autoencoder by at least minimizing the first loss;

training a second autoencoder comprising a second encoder and a second decoder, the second autoencoder trained to at least:

applying a transformation to the first training audio data to produce a first transformed training audio data;

obtaining a first transformed training spectrogram of the first transformed training audio data;

providing the first transformed training spectrogram to the second encoder to determine a first training content embedding;

obtaining a first voice identity embedding from a trained first autoencoder;

providing the first training content embedding and the first voice identity embedding to the second decoder to determine a second training output;

determining training ground truth for the second training output;

computing a second loss based on a second difference between the second training output and the training ground truth and a similarity between the content embedding and the training ground truth; and updating a second set of parameters of the second autoencoder by at least minimizing the second loss; and providing the first set of parameters of the first autoencoder and the second set of parameters of the second autoencoder for inferencing.

2. The computer-implemented method of claim 1, further comprising:

providing the second training output and the first training audio data to a discriminator;

obtaining, from the discriminator, a prediction of whether the training output is real or synthetic; and determining an adversarial loss based on prediction, wherein the second loss comprises the adversarial loss.

3. The computer-implemented method of claim 1, wherein the first training spectrogram is selected as the training ground truth.

4. The computer-implemented method of claim 1, wherein applying the transformation to the first training audio data to produce the first transformed training audio data comprises modifying a pitch of the first training audio data.

5. A system, comprising:

one or more processors; and memory storing executable instructions that, as a result of execution by the one or more processors, cause the system to:

train a first autoencoder, comprising a first encoder and a first decoder, the first autoencoder trained to at least:

obtaining first training audio data from a plurality of audio training data associated with a first identity;

obtaining a first training spectrogram of the first training audio data;

splitting the first training spectrogram into a plurality of training segments;

selecting a first training segment of the plurality of training segments;

providing the first training segment as a training input to the first encoder to determine a first training identity embedding;

providing the first training identity embedding to the first decoder to determine a first training output;

computing a first loss based on a first difference between the first training output and a second training segment of the plurality of training segments; and updating a first set of parameters of the first autoencoder by at least minimizing the first loss;

train a second autoencoder comprising a second encoder and a second decoder, the second autoencoder trained to at least:

applying a transformation to the first training audio data to produce a first transformed training audio data;

obtaining a first transformed training spectrogram of the first transformed training audio data;

providing the first transformed training spectrogram to the second encoder to determine a first training content embedding;

obtaining a first identity embedding from a trained first autoencoder;

providing the first training content embedding and the first identity embedding to the second decoder to determine a second training output;

determine training ground truth for the second training output;

computing a second loss based on a second difference between the second training output and the training ground truth and a similarity between the content embedding and the first identity embedding; and updating a second set of parameters of the second autoencoder by at least minimizing the second loss; and provide at least the second set of parameters of the second autoencoder for inferencing.

6. The system of claim 5, wherein the executable instructions include further instructions that, as a result of execution by the one or more processors, further cause the system to:

provide the second training output and the first training audio data to a discriminator;

obtain, from the discriminator, a prediction of whether the training output is real or synthetic; and determine an adversarial loss based on prediction, wherein the second loss comprises the adversarial loss.

7. The system of claim 5, wherein the executable instructions to determine the training ground truth for the second training output include instructions that, as a result of execution by the one or more processors, cause the system to:

obtain second audio training data associated with a second identity, wherein the second audio training data has corresponding content to the first audio training data; and obtain a second training spectrogram of the second training audio data to use as the training ground truth.

8. The system of claim 5, wherein the executable instructions to apply the transformation to the first training audio data to produce the first transformed training audio data include instructions that, as a result of execution by the one or more processors, cause the system to:

modify a pitch of the first training audio data.

9. The system of claim 5, wherein the executable instructions include further instructions that, as a result of execution by the one or more processors, further cause the system to:

select a plurality of songs of an artist from a content provider library; and store the first identity embedding in an identity store comprising identity embeddings for a plurality of artists.

10. The system of claim 5, wherein the executable instructions include further instructions that, as a result of execution by the one or more processors, further cause the system to:

provide a user with a first graphical interface element to select an identity for generating synthesized audio content;

determine the identity corresponds to the user;

record audio data from the user; and use the audio data from the user as the first training audio data.

11. The system of claim 10, wherein the executable instructions include further instructions that, as a result of execution by the one or more processors, further cause the system to:

provide the user with a second graphical interface element to select an audio content for generating synthesized audio content;

determine a content embedding associated with the audio content; and determine the synthesized audio content based on content embedding and the first identity embedding.

12. The system of claim 11, wherein the executable instructions to determine the content embedding associated with the audio content includes instructions that, as a result of execution, cause the system to:

obtain a trained second encoder based on the second set of parameters; and determine the content embedding from the audio content based on the trained second encoder.

13. The system of claim 5, wherein the spectrogram is a mel spectrogram.

14. A non-transitory computer-readable storage medium storing executable instructions that, as a result of being executed by one or more processors of a computer system, cause the computer system to at least:

train a first autoencoder, comprising a first encoder and a first decoder, the first autoencoder trained to at least:

obtaining first training audio data from a plurality of audio training data associated with a first identity;

obtaining a first training spectrogram of the first training audio data;

splitting the first training spectrogram into a plurality of training segments;

selecting a first training segment of the plurality of training segments;

providing the first training segment as a training input to the first encoder to determine a first training identity embedding;

providing the first training identity embedding to the first decoder to determine a first training output;

computing a first loss based on a first difference between the first training output and a second training segment of the plurality of training segments; and updating a first set of parameters of the first autoencoder by at least minimizing the first loss;

train a second autoencoder comprising a second encoder and a second decoder, the second autoencoder trained to at least:

applying a transformation to the first training audio data to produce a first transformed training audio data;

obtaining a first transformed training spectrogram of the first transformed training audio data;

providing the first transformed training spectrogram to the second encoder to determine a first training content embedding;

obtaining a first identity embedding from a trained first autoencoder;

providing the first training content embedding and the first identity embedding to the second decoder to determine a second training output;

determine training ground truth for the second training output;

computing a second loss based on a second difference between the second training output and the training ground truth and a similarity between the content embedding and the first identity embedding; and updating a second set of parameters of the second autoencoder by at least minimizing the second loss; and provide at least the second set of parameters of the second autoencoder for inferencing.

15. The non-transitory computer-readable storage medium of claim 14, wherein the instructions include further instructions that, as a result of execution by the one or more processors, further cause the system to:

provide the second training output and the first training audio data to a discriminator;

obtain, from the discriminator, a prediction of whether the training output is real or synthetic; and determine an adversarial loss based on prediction, wherein the second loss comprises the adversarial loss.

16. The non-transitory computer-readable storage medium of claim 14, wherein the instructions to determine the training ground truth for the second training output include instructions that, as a result of execution by the one or more processors, cause the system to:

obtain second audio training data associated with a second identity, wherein the second audio training data has corresponding content to the first audio training data; and obtain a second training spectrogram of the second training audio data to use as the training ground truth.

17. The non-transitory computer-readable storage medium of claim 14, wherein the instructions to apply the transformation to the first training audio data to produce the first transformed training audio data include instructions that, as a result of execution by the one or more processors, cause the system to:

modify a pitch of the first training audio data.

18. The non-transitory computer-readable storage medium of claim 14, wherein the instructions include further instructions that, as a result of execution by the one or more processors, further cause the system to:

select a plurality of songs of an artist from a content provider library; and store the first identity embedding in an identity store comprising identity embeddings for a plurality of artists.

19. The non-transitory computer-readable storage medium of claim 14, wherein the instructions include further instructions that, as a result of execution by the one or more processors, further cause the system to:

provide a user with a first graphical interface element to select an identity for generating synthesized audio content;

determine the identity corresponds to the user;

record audio data from the user; and use the audio data from the user as the first training audio data.

20. The non-transitory computer-readable storage medium of claim 19, wherein the instructions include further instructions that, as a result of execution by the one or more processors, further cause the system to:

provide the user with a second graphical interface element to select an audio content for generating synthesized audio content;

determine a content embedding associated with the audio content; and determine the synthesized audio content based on content embedding and the first identity embedding.

\* \* \* \* \*